United States Patent [19]

Schreyer et al.

[11] 4,236,456
[45] Dec. 2, 1980

[54] TROLLEY SUSPENSION

[75] Inventors: Kenneth D. Schreyer, Clarence; Earl T. Leverentz, N. Tonawanda; Thomas R. Nusz, Amherst, all of N.Y.

[73] Assignee: Columbus McKinnon Corporation, Tonawanda, N.Y.

[21] Appl. No.: 959,678

[22] Filed: Nov. 13, 1978

[51] Int. Cl.³ .................... B61B 3/00; E01B 25/22; E05D 13/02
[52] U.S. Cl. ............................. 105/154; 16/98; 104/95; 198/678
[58] Field of Search .................... 16/97, 99, 105, 98; 104/94, 95, 247, 93; 105/154, 155, 150; 198/678

[56] References Cited

U.S. PATENT DOCUMENTS

| | | | |
|---|---|---|---|
| 318,165 | 5/1885 | Cartwright | 105/154 |
| 1,392,912 | 10/1921 | Chesnutt | 308/190 X |
| 1,446,463 | 2/1923 | Hoffman | 105/154 |
| 1,600,878 | 9/1926 | Hegarty | 105/154 |
| 2,843,872 | 7/1958 | Hannon | 16/105 |
| 2,920,918 | 1/1960 | Nojima | 295/1 |
| 3,072,075 | 1/1963 | Nojima | 105/150 |
| 3,171,697 | 3/1965 | Nicolaides | 308/190 |
| 3,231,067 | 1/1966 | Gaboury et al. | 16/97 X |
| 3,602,150 | 8/1971 | Frost | 105/155 |

FOREIGN PATENT DOCUMENTS

| | | | |
|---|---|---|---|
| 109814 | 4/1925 | Switzerland | 105/154 |
| 1394640 | 5/1925 | United Kingdom | 105/154 |

Primary Examiner—Howard Beltran
Attorney, Agent, or Firm—Bean, Kauffman & Bean

[57] ABSTRACT

A rolling trolley device adapted to ride upon opposite side flanges of a support beam; said trolley device comprising a generally V-shaped load supporting yoke bar of one-piece formation carrying at the opposite legs thereof a pair of generally tubular-shaped trolley wheel support housings; wheel support members extending from said housings at opposite sides of the legs of said bar; and support beam engaging wheels mounted upon said support members; said housings being keyed to said yoke bar legs in positionally adjustable relation thereon to adapt said device to operate efficiently on a large variety of support beam sizes and flange width and slope configurations. The trolley wheels are carried by said housings so as to rotate about axes which slope away from and into acute angle intersections with the planes of the trolley wheel contact/support surfaces; thereby directionally balancing out the thrust load and reaction load forces to provide an improved wheel tracking operation.

12 Claims, 8 Drawing Figures

TROLLEY SUSPENSION

BACKGROUND OF THE INVENTION

This invention relates to trolleys or rolling hangers, such as are used in so-called overhead trolley conveyor systems and the like such as include oppositely paired trolley wheels arranged to roll along support rails such as the bottom flanges of I-beams, or the like. Such trolley devices typically employ generally U-shaped yoke means fabricated of multiple parts to suspend from the trolley wheels to engage the dependent load.

The invention deals specially with the reality that standard production type I-beams are invariably of different flange sectional profile, notwithstanding that they are conventionally manufactured and purchased under identical "specifications". This is because such items are produced on different rolling mills at domestic and/or foreign factories operating under different design "standards"; and although in each case the rolls thereof are initially shaped to produce a "specified" size and shape (sectional form) of I-beam, because of the constantly increased wear effects on the rolls throughout their working "lives" they in fact never do produce any two or more I-beams of identical flange sectional profiles.

Heretofore trolley wheels for such purposes have of course been tread-profile-designed so as to be best suited to the "specified" flange profile upon which they are designated to be used; although as explained hereinabove no two I-beams of the same "specifications" present to the trolley wheels the identically same slope configurations. In consequence, the industry has been beset by the problem that prior trolley devices have been not only propense to undue operational deterioration/destruction, but also cause premature destruction of the flanges of the trolley support beam. In fact, with a view to more economically furnishing the conveyor industry with a suitable "universal" type trolley device adapted to provide reasonably efficient and economical service while riding on any of a variety of either flat or sloped surfaces, some manufacturers have been furnishing such devices with trolley wheels which are composites of flat and sloped profile tread configurations, which obviously provide only compromise attempts to answer the problem.

SUMMARY AND OBJECTS OF THE INVENTION

A primary object of the present invention is to provide an improved type trolley wheel support assembly which is adjustable to adapt it to operate with long-life efficiency on a large variety of flat or floping support surfaces; whereby the trolley wheels thereof tend to ride constantly in a path mid-way of the flange slope under varying load carrying conditions; thereby minimizing abuse and wearing away of the edges of the support beam flanges.

Another object is to provide a trolley wheel mounting system as aforesaid which is adapted to meet any specified strength requirements while being of substantially lighter weight than prior type trolley constructions such as are designed to meet similar loading conditions.

Another object is to provide an improved trolley structure as aforesaid which facilitates easy and positive adjustments of the mountings of the trolley wheels thereof on their support members; thereby suiting the same trolley assembly to operate efficiently on and with less wear/tear damage to support beams of a large variety of sizes and flange width and slope configurations.

Still another object is to provide a trolley as aforesaid which is capable of negotiating tight radius curve trackways with improved facility.

Other objects and advantages of the invention will appear from the accompanying specification and drawing wherein:

BRIEF DESCRIPTION OF THE DRAWING

FIG. 1 is a side elevational view of a trolley construction of the present invention, shown as being mounted upon an I-beam and carrying therebelow an electric hoist or the like;

DETAILED DESCRIPTION OF THE PREFERRED EMBODIMENTS

Figure 1:
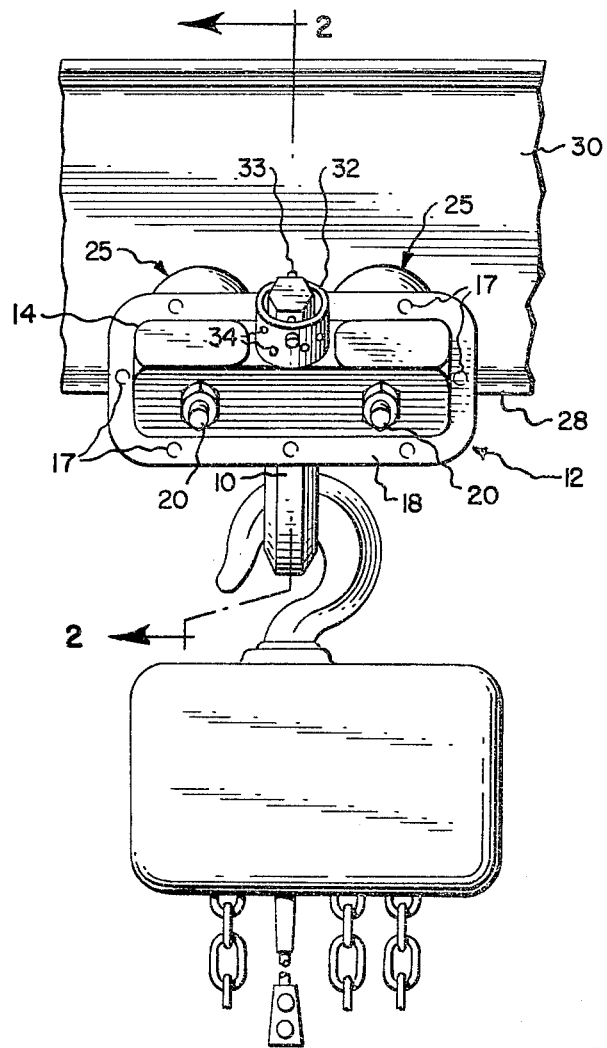
Figure 3:
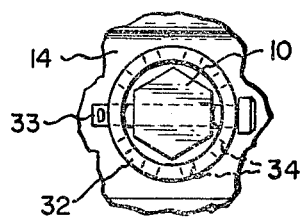
FIG. 3 is a fragmentary sectional view taken as suggested by line 3—3 of FIG. 2.
Figure 4:
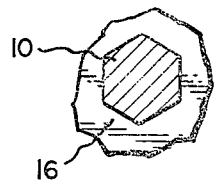
FIG. 4 is a fragmentary section, taken on line 4—4 of FIG. 2.

As shown in the drawing by way of example herewith, the invention features provision of a generally V-shaped yoke bar 10 which carries at its upper leg end portions the trolley wheels of the assembly, as will be more fully explained hereinafter. As shown herein the bar 10 is formed of a single piece of hexagonally sectioned metal bar stock. However, any bar stock material of other angularly sectioned form may be employed in construction of the bar; such as bar stock of triangular, square, or hexagonal sectional form, or the like. Alternatively, the major portion of the bar may be of circular cross-section and the legs of the bar splined or key-slotted, so as to be in any case adapted to receive in "keyed" relation thereon the wheel mounting housings 12 which are slide-fitted upon the upper ends of the opposite legs of the yoke bar 10 and thus into non-rotationally keyed relation thereon.

The housings 12 are of generally tubular-shaped form, and each comprises a pair of half shell members as are designated 14, 16. The members 14, 16 may be stamped out and/or identically formed from any suitable sheet metal stock to include peripheral flange portions 18–19 which are adapted to mate in complementing opposed relation when one of the half members is lengthwise reversely oriented relative to the other. The flanges of the paired half shell members are thereupon welded together as shown at 17 so that each housing 12 then comprises a torsionally resistant tubular-like structure. As best shown at FIG. 1, the housing members 12 are elongated transversely of the yoke bar 10 so as to be adapted to accommodate in each case a pair (or more) of wheel support bolts as shown at 20—20.

Figure 2:
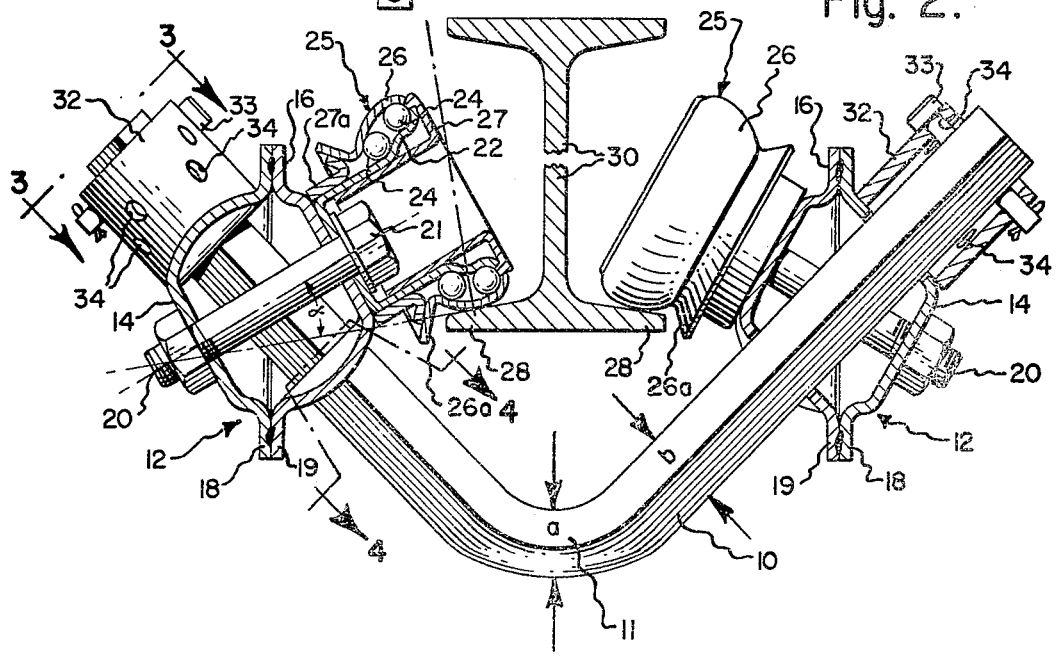
FIG. 2 is an enlarged scale fragmented sectional view taken as suggested by line 2—2 of FIG. 1, but showing at the right hand side thereof one of the trolley wheels in elevation.

The wheel support bolts 20 are headed as indicated at 21 and are slip-fitted (or threaded) through suitably apertured wall portions of the housing members so as to pass along opposite sides of the yoke bar 10. The bolts mount in each case under the heads thereof a generally cylindrically shaped inner race member 22 which in turn supports a train of ball bearings as shown at 24. As shown at FIGS. 1, 2, the trolley wheel structures are designated generally at 25, and each includes a cooperating outer bearing race or retaining casing member 26 which terminates in an outwardly bent wheel travel guide flange 26a. Bearing seals made of flexible sheet material (as are well known in the art) may be employed as shown at 27, 27a, to isolate the bearing system from ingress of external dirt or the like. Thus, as best shown for example at FIGS. 2 and 5, the outer casing member 26 of each wheel is rotatably mounted on the inner race portion 22.

Note that the wheels 25 are cantilever mounted on the housings 12 by means of the headed bolts 20, and that the relative angularities of the legs of the yoke bar 10; the shapes of the housings 12—12; and the attitudes of the bolts 20 relative to their housings cooperate to regulate the attitudes of the axes of rotation of the wheels 25 relative to the flanges of the support beam. Note also that as shown by the drawing herewith, the system is arranged so that the plane of the tread surface of the support beam extends laterally away from the web of the beam so as to intersect the axis of rotation of the wheel at an acute angle alpha, or as put another way, such axis inclines laterally outwardly and downwardly away from the beam so as to intersect the plane of the tracking surface at such acute angle. As a result, the wheels normally tend to track along the median of the support beam flange. However, under excessive load conditions the wheels tend if anything to "ride" inwardly on the flange toward the web of the beam, instead of sliding in the other direction and onto the thin outer edges of the beam when rolling longitudinally of the beam. The phenomenon may be analogous to the fact that a belt traveling around a flat roller tends to creep laterally and upwardly toward the high side of the roller.

As shown at FIG. 2, the outer race portions 26 of the wheels 25 are cross-sectionally convex-shaped and roll along their supports, such as the bottom flange portions 28—28 of a hoist support I-beam 30. Thus, initially the wheels contact the beam flanges and roll therealong in a narrow "line" contact manner. The outer surfaces of the tread portions of the wheels are preferably case-hardened to increase their wear resistance characteristics. Hence, the initial wear on each I-beam flange is concentrated in a narrow pathway extending lengthwise of the I-beam. This produces initially an operationally perceptive (however small) grooved guideway for the trolley wheel travel. As usage of the trolley continues the width of the contact area between the wheels and the I-beam increases, whereby the rate of wear on the wheels and on the I-beam decreases; while at the same time the wheels continue to tend to track in line with the initially formed path on the I-beam. Thus, undue side-slipping of the trolley wheels and resultant wearing thereof against the relatively thin outer edges of the I-beam flanges is avoided; whereby the working lives of the I-beam and of the trolley wheels are increased.

As previously noted, the housings 12 are slip-fitted onto the yoke bar legs, and are held against displacement therefrom under working conditions by means of collars 32 and locking pins 33. The collars 32 are provided with series of diametrically matching pin receiving apertures 34 at different elevations therealong; whereby it will be appreciated that the collars 32 may be fixed by means of the pins 33 at various locations along the legs of the yoke bar; thereby adjusting the trolley device to suit differently sized and configured support beams.

Figure 5:
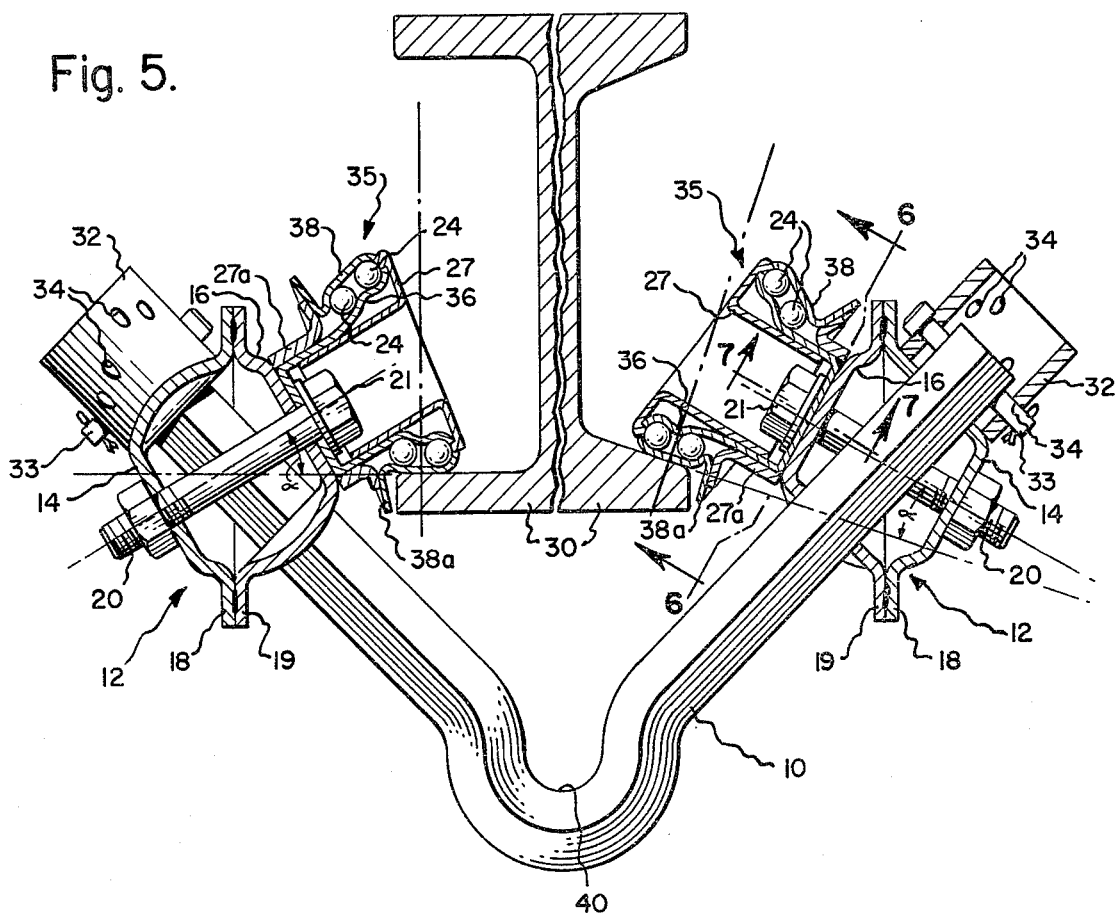
FIG. 5 is a composite view corresponding generally to FIG. 2, but illustrates a modified form of the trolley wheel construction; showing at the left and right hand sides thereof the wheel devices thereof as being adjusted on their mounts so as to efficiently operate on a flat and on a sloped support beam flange, respectively.
Figure 6:
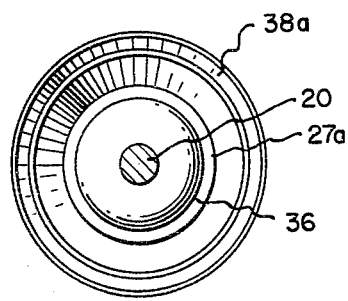
FIG. 6 is a section taken on line 6—6 of FIG. 5.
Figure 7:
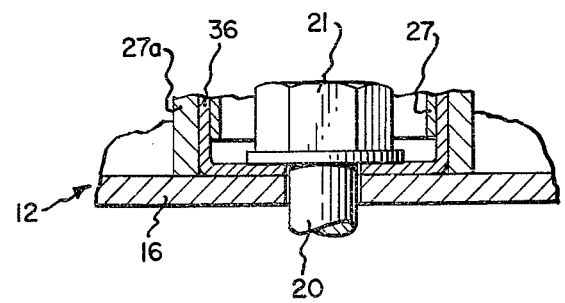
FIG. 7 is an enlarged scale fragmentary section taken on line 7—7 of FIG. 5.
Figure 8:
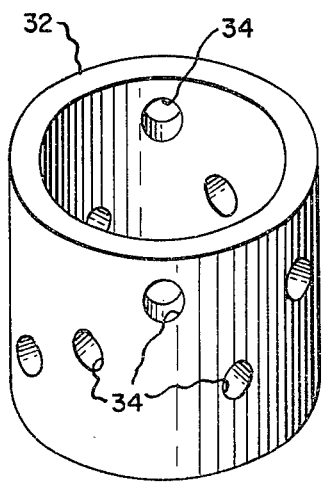
FIG. 8 is an enlarged scale disassembled perspective view of a positional adjustment control member of the trolley wheel mount mechanism.

FIG. 5 illustrates provision of a modified form of wheel as is designated generally at 35, whereby the inner race portions of the wheels may be mounted on the housings 12 so as to be rotationally adjustable thereon to suit the same trolley to operate on support beams having flanges of different slopes. By way of example, the wheel 35 at the left side of composite FIG. 5 is shown as being mounted on its housing 12 in such manner as to suit the wheel to run along a "flat" or horizontally disposed I-beam flange or the like; while the same type wheel 35 at the right hand side of FIG. 5 is shown as being adjusted on its housing 12 so as to be adapted to run along a substantially sloped beam flange.

In this type wheel construction the inner race member is shown at 36 and the outer race at 38 which includes an outstanding wheel travel guide flange 38a. Both race members, while being generally of cylindrical form, are also of obliquely truncated form; whereby the plane of wheel rotation is canted relative to the orientation of the support of the wheel system, instead of being normal thereto as in the case of FIGS. 1, 2. Hence, it will be understood that the wheels 35 of FIG. 5 may be clamped upon their housing 12 by means of the bolts 20 in any desired condition of orientation about their axes of rotation, thereby adapting them to ride equally well on support flanges of any degree of slope (or flat) to which they may have been adjusted.

Hence, it will be understood that the trolley of the invention operates not only to resist any tendencies of the wheels to slide outwardly and away from the web of the support beam so as to ride along the feathered edges of the beam flanges, but also operates to widen the path of travel of the wheels width-wise of the flanges and to spread the wear of wheel travel over larger areas. This effect may be augmented by sectionally thinning somewhat the apex portion of the load bar as shown at 11 (FIG. 2), thereby reducing the section modulus of the load carrying saddle portion 11 of the load bar 10 relative to the remainder of the load bar and other wheel support components of the system. Note that dimension "a" (FIG. 2) is less than dimension "b".

Alternately, this effect may be augmented by bowing or "dropping" the yoke configuration in side elevation downwardly at its center portion, such as is shown at 40 (FIG. 5). This latter type construction also provides an automatically functioning centralizing "well" for reception of the suspended load carrying member; whereby the accommodated suspended load connection device tends to hang at all times in the center portion of the yoke bar. Therefore, whenever the trolley traverses trackway curves, and/or whenever the load is otherwise caused to deflect laterally away from the path of travel along the overhead support beam, side slipping of the suspended load carrying member relative to the yoke bar is prevented. Thus, the trolley of the present invention maintains a uniform travel relationship with the support beam, thereby preventing abuse of the support beam flanges as discussed hereinabove.

It is a particular feature of the invention that the wheel support housing members of the device are in the form of lightweight efficient torque resistant members which are adjustable to suit the device to operate on a variety of support beam configurations, and which support the trolley wheels relative to the yoke bar in novel manner. Furthermore, the invention features use of a novel form of trolley wheel and support thereof relative to the wheel travel surfaces of the support beam, which not only provides for an improved "tracking" of the wheels when traveling under varying loads along sloping beam flanges, but which also obviates the problem of "scrubbing" of the beam flange edges; thereby permitting the trolley to freely negotiate much tighter radius curves than is possible with prior art trolley constructions.

We claim:

1. An overhead rolling trolley device adapted to ride upon upper planar trolley wheel tracking surfaces of opposite side flanges of a support beam;

said trolley device comprising a generally V-shaped load support bar having a cross-section of several sides and including at its lower apex end a saddle portion for suspending a load and carrying at each of the opposite legs thereof a trolley wheel support housing;

support beam engaging wheels mounted upon each of said housings at opposite sides of said support bar legs;

said support housings being fixed against rotation about said support bar legs having a mating configuration therewith to allow for longitudinally adjustable relation thereon to adapt said device to be adjustable to operate efficiently on tracking surfaces of different width and slope configurations; and locking means inter-engaging said housings and said support bar legs to maintain said housings at prescribed positions longitudinally on said legs.

2. A rolling trolley device as set forth in claim 1 wherein said locking means comprises collar devices which are slidably mounted on said bar legs to overbear said housings, and wherein means are provided for fixing said collar devices at adjusted positions longitudinally on said lets.

3. A rolling trolley as set forth in claim 1, wherein said wheel support housings are each fabricated of a pair of generally semi-cylindrical-box-shaped members which are fixedly interconnected to provide a generally tubular box-shaped housing of closed end and side wall form.

4. A rolling trolley as set forth in claim 1, wherein said support bar leg portions are of angularly sectioned form and wherein said housings are so apertured as to be longitudinally slidable on said leg portions.

5. A rolling trolley device as set forth in claim 1, wherein the axis of rotation of the trolley wheel inclines laterally outwardly and downwardly away from the beam so as to intersect the plane of the tracking surface of the beam at an acute angle.

6. A rolling trolley as set forth in claim 1, wherein each of said wheels comprises an inner bearing race member fixed to one of said housings and an outer race member circumscribing said inner race member, and a plurality of rolling bearing members encompassed in aligned relation therebetween.

7. A rolling trolley as set forth in claim 4 wherein said inner and outer bearing race members are generally cylindrically shaped and are formed of sheet metal stock.

8. A rolling trolley as set forth in claim 7, wherein said outer race member includes a peripherally outwardly extending flange portion adapted to cooperate with the edge of the support beam to guide said trolley when traveling along said beam.

9. A rolling trolley as set forth in claim 7, wherein said rolling bearing members are of the ball bearing type.

10. A rolling trolley as set forth in claim 9, wherein said inner and outer race members are of obliquely truncated form, thereby disposing the plane of rotation of said rolling bearing members to be canted away from normalcy relative to their axes.

11. An overhead rolling trolley device adapted to ride upon upper planar trolley wheel tracking surfaces of opposite legs flanges of a support beam;

said trolley device comprising a one piece generally V-shaped load support bar having a cross-section of several sides and including at its lower apex end a saddle portion suspending a load and carrying at each of the opposite legs thereof a generally cylindrical-box-shaped trolley wheel support housing;

support beam engaging wheels mounted upon each of said housings at opposite sides of said support bar legs;

said support housings being fixed against rotation about said support bar legs having a mating configuration therewith to allow for longitudinally adjustable relation thereon to adapt said device to be adjustable to operate efficiently on tracking surfaces of different width and slope configurations; and locking means inter-engaging said housings and said support bar legs to maintain said housings at prescribed positions longitudinally on said legs.

12. A rolling trolley device as set forth in either claim 11 wherein said locking means comprises collar devices which are slidably mounted on said bar legs to overbear said housings, and wherein means are provided for fixing said collar devices at adjusted positions longitudinally on said legs.

* * * * *

UNITED STATES PATENT AND TRADEMARK OFFICE
CERTIFICATE OF CORRECTION

PATENT NO. : 4,236,456
DATED : December 2, 1980
INVENTOR(S) : Kenneth D. Schreyer et al It is certified that error appears in the above-identified patent and that said Letters Patent are hereby corrected as shown below:

Col. 1, Line 53 - Please change "floping" to --sloping--.

Claim 2, Line 51 - Please change "lets" to --legs--.

Claim 12, line 1, before "claim" delete "either"

Signed and Sealed this

Fourteenth Day of April 1981

[SEAL]

Attest:

RENE D. TEGTMEYER

Attesting Officer    Acting Commissioner of Patents and Trademarks